United States Patent Office 3,562,053
Patented Feb. 9, 1971

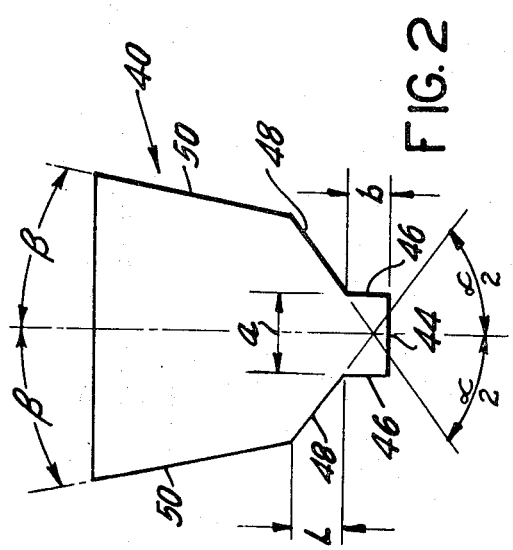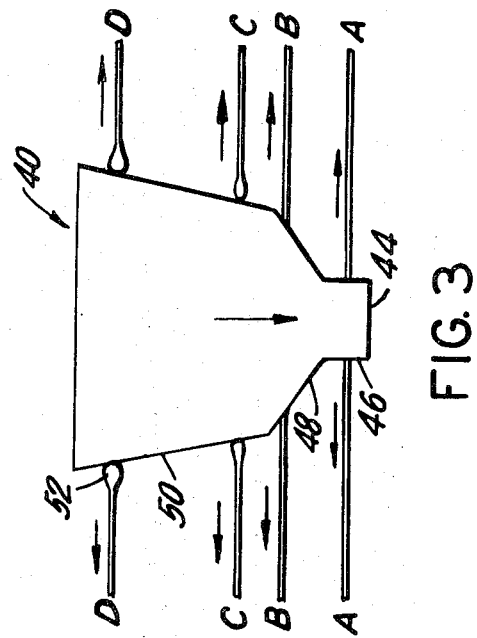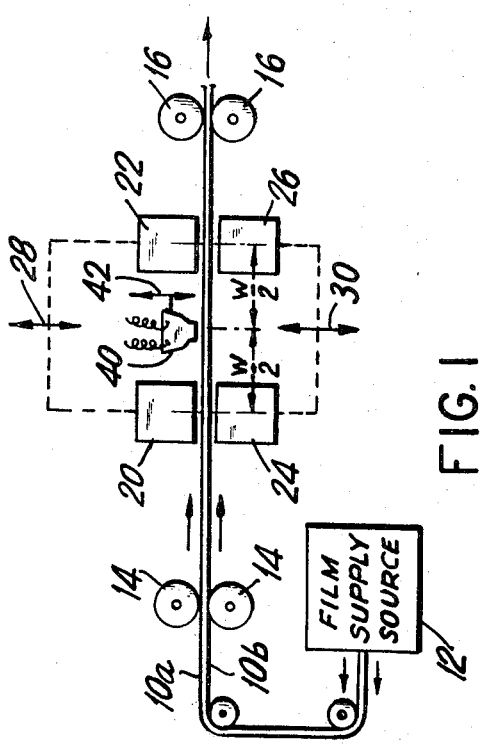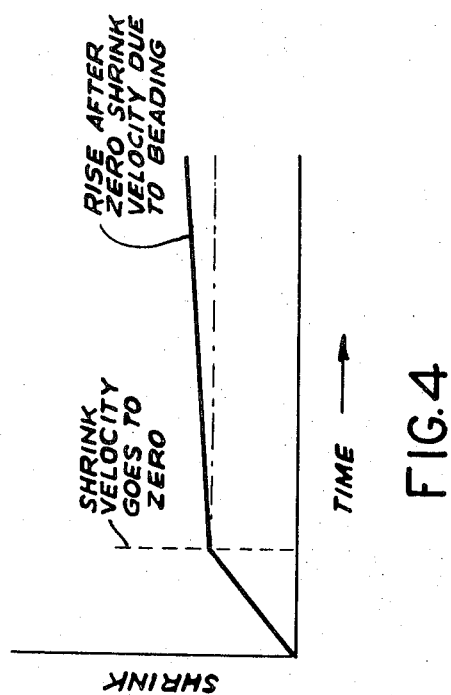
INVENTOR.
DONALD C. LINDLEY
BY
ATTORNEY

3,562,053
APPARATUS AND METHOD FOR HEAT SEALING HEAT SHRINKABLE FILM
Donald C. Lindley, Tulsa, Okla., assignor to Poly-Version, Inc., Tulsa, Okla.
Filed June 19, 1967, Ser. No. 646,893
Int. Cl. B32b 31/18
U.S. Cl. 156—251                               7 Claims

ABSTRACT OF THE DISCLOSURE

An apparatus for heat sealing shrinkable thermo-plastic films. A specially shaped knife is used which maintains thermal contact during a severing operation.

---

This invention relates generally to sealing of thermoplastic material and more particularly to improved apparatus for heat sealing a heat shrinkable thermo-plastic film.

Heat sealable thermo-plastic sheets are becoming increasingly popular as a packaging medium. In some instances the edges of opposed layers of plastic film are heated with the merchandise in place to form a sealed package while in other applications the edges of the plastic are heat sealed to provide an empty container, such as a bag. The packages or the containers may be fabricated as a continuous strip that is later severed into individual units. Alternatively means are also used to sever the units from the supply source simultaneously with the heat sealing of the edges.

The last mentioned technique has caused serious problems in the packaging industry and it is to the solution of these particular problems that the present invention is directed. Plastic films such as oriented polyolefins have a tendency to shrink upon the application of heat. "Clysar" polyolefin film, manufactured by E. I. du Pont and Company, is an example of a heat sealable film that is heat shrinkable. While the shrink rate of the film is a known factor, the prior art does not provide means for maintaining the heating means in contact with the film edges immediately subsequent to severance. The result is that after the film is severed by a knife or heater bar, the film draws away and a satisfactory sealing bead is not obtained.

Applicant has found that for a given type of material, and taking into consideration the speed with which the sealing must take place, a specific cross sectional configuration must be utilized for the heated bar that both severs and seals the plastic film. By making the heater bar with a flat bottom sufficient heat is applied to the film to sever a portion of it from the supply roll. The remainder of the heater bar is formed with outwardly diverging sides so that as the heater bar continues its downward stroke through the film, the edges of the film remain in contact wtih the heating means, even though the film is shrinking and tending to pull away.

The present invention is in direct contrast to prior art devices that first use a knife edge to sever the film and then rely on the sides of the knife to apply heat to the severed edges in order to produce the weld. Even where the prior art does use film hold down means in combination with the heated knife, they are not capable of satisfactorily sealing heat shrinkable films at commercial production rates. The principal difficulty with prior art approaches is in getting sufficient heat into the seal area as the film shrinks away from the hot knife. The prior art apparatus and methods could provide good heat seals only if the film moved slowly since it was necessary to maintain the hot knife in contact with the film edges for relatively long periods of time. However, present day bagging rates are upward of 100 cycles per minute and it is in this area that the present invention exhibits superior qualities. As will be described in detail hereinafter, the present apparatus retains the film adjacent the seal area and by passing a hot tapered bar through the film the edges thereof remain in contact with the heat source to permit the buildup of an edge bead.

Accordingly, it is an object of this invention to provide improved apparatus for severing and sealing the edges of plastic film layers.

Another object of this invention is to provide heat sealing means having a tapered cross sectional shape that is a function of shrink rate and sealing speed of the plastic film.

An important object is to provide the aforementioned heat sealing means in combination with film hold down means.

A specific object of this invention is to provide plastic film severing and sealing means having a first, flat area for the local application of heat and at least one secondary arc at an angle to the film for sealing the edges thereof.

Yet another object is to provide an improved method of severing and heat sealing heat shrinkable layers of plastic film.

An addiitonal object of this invention is to provide an improved method as described above wherein heat is supplied to the edges of the film after it is severed and while it is shrinking.

These and other objects, features and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

In the drawings:

FIG. 1 is a schematic view of the apparatus comprising this invention;

FIG. 2 is an enlarged cross sectional view of a heating member constructed in accordance with the concepts of this invention;

FIG. 3 is an enlarged schematic view illustrating the effect of the present apparatus as it passes through the film; and FIG. 4 is a graph illustrating the relationship of the film shrinkage with respect to time.

Referring now to the drawing, it will be seen in FIG. 1 that two layers of plastic film 10a and 10b are taken from a supply source 12 by a pair of drive roller pairs 14 and removed from the heat sealing area by a pair of rollers 16. Since the invention does not reside in this area of the system, the actuating means for the drive rolls is not shown nor is the supply roll shown in detail. The present invention is equally applicable to either a sheet of plastic film that is folded over on itself or to two separate layers of film. Accordingly, the film will be described generally as two separate layers that are to be joined to each other by heat sealing means.

Means are provided to intermittently retard the longitudinal movement of the film layers. Upper clamp members 20 and 22 are arranged to move in unison in a direction perpendicular to the plane of the sheets and their direction of movement. Ganged lower clamp members 24 and 26 are spacedly opposed to clamps 20 and 22 and are arranged for the same line of movement but in an opposite direction. Since the four clamp members move at the same time, it will be apparent that the sheets are intermittently clamped to each other. Means to move the clamping pairs as described are schematically indicated as reference characters 28 and 30.

Novel heat sealing means 40 is positioned between the upper clamping means and is arranged for movement towards and away from the film layers by means schematically shown as reference character 42. Suitable means, not shown, are used to time the movement of the clamping means and the heat sealing means. The clamping means, in combination with the heater bar whose shape is a function of the shrink rate of the film and the sealing rate of speed, forms the heart of this invention and will now be discussed in conjunction with FIG. 2 and FIG. 3.

Heat sealing means 40 is fabricated of a suitable heat conductive material, examples of which are given in U.S. Pat. No. 3,083,757 issued to D. L. Kraft et al. on Apr. 2, 1963. The severing portion of the heating bar is comprised of a flat base 44 and two upstanding walls 46. Downward movement of bar 40 causes base 44 to contact the film first. Walls 48 extend upwardly and outwardly from walls 46 and terminate at outwardly flared sides 50. Heat may be supplied to bar 40 by any of the well known and conventional means such as electrical leads connected to a suitable power source. Base 44 is of width $a$.

Several important dimensional relationships that are useful in understanding the theory of this invention are shown in FIG. 2. Using a sheet of 1½ mils thick polyolefin, it is known that the shrink rate is high. Dimension $b$ should be kept as small as possible and yet supply sufficient heat to effect severance of the film. The angle $\alpha$ at which wall 48 is disposed may be derived from the equation:

$$\tan(\tfrac{1}{2}\alpha) = \tfrac{1}{2}\frac{S}{TL}$$

wherein:

S = shrink rate of the film in inches/second;
T = available heat sealing time which is equal to ½ of the inverse of the production rate in cycles per second; and
L = length of travel through the film.

As may be seen in FIG. 4, the shrink velocity is linear for a short period of time. During this length of time the edge seal is made. However, side 50 is disposed at a small angle $\beta$ relative to the longitudinal center line X in contrast to the large angle $\alpha/2$ formed by wall 48 relative to the longitudinal center line X. The change in angle compensates for the beading effect that follows the sealing of the edge.

FIG. 3 may be used to understand the beading action as well as the entire sequence. At level A—A base portion 44 has already heated and severed the film and the film has started to move away from the heating device due to shrinkage as indicated by the arrows. Further downward movement of member 40 maintains the outwardly sloped walls 48 in contact with the edges of the film. This condition is shown at level B—B.

For the length of time that wall 48 is in contact with the film edge, and the edge is being sealed, the shrink velocity is linear. However, the velocity suddenly goes to zero at the time indicated by the broken line in FIG. 4. Thereafter the shrink rate is very small during which time a bead 52 forms. This is shown schematically between levels C—C and D—D which correspond to the length of side 50. Thus a small angle $\beta$ is provided for the small additional shrinkage. It should be noted that the bead 52 grows from the time side 50 first contacts the sealed edge until the time when the heater bar has descended the maximum distance.

The location of the clamping means in relation to the heater bar is an important factor. Preferably, the clamping members should be as close as practical to the centerline of the heat sealing means. Without the use of clamping means the film will distort at an uncontrolled and unpredictable rate. In fact, there will be some tendency for the film to move towards the point of heat application. However, by using clamping means that maintains the film taut the shrink rate is predictable. The present invention utilizes this characteristc of the film and provides a tapered heater bar whose side walls will remain in contact with the film edges during the linear shrinking thereof. Since heat is maintained in the film edge, a good seal is achieved and an enlarged bead is formed.

Having thus disclosed the best embodiment of the invention presently contemplated, it is to be understood that various changes and modifications may be made by those skilled in the art without departing from the spirit of the invention.

What I claim as new and desire to secure by Letters Patent is:

1. Improved heat sealing apparatus for superimposed layers of heat shrinkable plastic film, said apparatus comprising:
   (a) a heat conductive member having a flat bottom surface and a pair of side walls each of which includes a first section positioned at a relatively large angle $\alpha/2$ with respect to the longitudinal center line thereof and a second section remote from said bottom surface and positioned at a relatively small angle $\beta$ with respect to the longitudinal center line thereof;
   (b) drive means for moving said heat conductive member towards and away from the film whereby said bottom surface passes through the film a sufficient distance to permit both said first and second sections of said side walls to successively contact and seal the film layers; and
   (c) clamping means for holding the film when said heat conductive member passes therethrough.

2. The apparatus in accordance with claim 1 wherein said first section of each of said side walls is positioned as defined by the equation $$\tan(\tfrac{1}{2}\alpha) = \tfrac{1}{2}\frac{S}{TL}$$

wherein S is the shrink rate of the film, T is the available heat-sealing time and L is the length of travel of said side walls through the film.

3. The apparatus in accordance with claim 1 wherein said clamping means comprises spaced upper members and spaced lower members in opposition to said upper members, said heat conductive member being positioned between said spaced upper members.

4. Improved heat sealing apparatus for superimposed layers of heat shrinkable plastic film, said apparatus comprising:
   (a) a heat conductive member having a bottom end and at least one side wall which includes a first section positioned at a relatively large angle $\alpha/2$ with respect to the longitudinal center line thereof and a second section remote from said bottom end and positioned at a relatively small angle $\beta$ with respect to the longitudinal center line thereof;
   (b) drive means for moving said heat conductive member towards and away from the film whereby said bottom end passes through the film a sufficient distance to permit said first and second side wall sections to successively contact and seal the film layers; and
   (c) clamp means for holding the film when said heat conductive member passes therethrough.

5. The apparatus in accordance with claim 4 wherein said first section of said side wall is positioned as defined by the equation $$\tan(\tfrac{1}{2}\alpha) = \tfrac{1}{2}\frac{S}{TL}$$

wherein S is the shrink rate of the film, T is the available heat sealing time and L is the length of travel of said side wall through the film.

6. The apparatus in accordance with claim 4 wherein said clamping means comprises spaced upper members and spaced lower members in opposition to said upper members, said heat conductive member being positioned between said spaced upper members.

7. A method for simultaneously severing and heat sealing layers of plastic film comprising the steps of:
   (a) longitudinally moving the sheets;
   (b) intermittently clamping the sheets to prevent movement thereof;
   (c) applying a heated member to the clamped sheets whereby the heated member passes at least partially through the film layers; and
   (d) maintaining successive portions of the heated member in contact with the film until a bead is formed at the severed edge of the film, the successive portions of the heated member being further away from the longitudinal center line thereof.

References Cited
UNITED STATES PATENTS

| | | | |
|---|---|---|---|
| 2,794,485 | 6/1957 | Ashton et al. | 156—251X |
| 3,144,372 | 8/1964 | Peterson et al. | 156—251 |
| 3,321,353 | 5/1967 | Zelnick | 156—515X |
| 3,334,004 | 8/1967 | Faust et al. | 156—583X |
| 3,423,271 | 1/1969 | Kallert et al. | 156—380 |

VERLIN R. PENDEGRASS, Primary Examiner

U.S. Cl. X.R.

156—515